(12) United States Patent
Engel et al.

(10) Patent No.: US 10,873,199 B2
(45) Date of Patent: Dec. 22, 2020

(54) VEHICLE ELECTRICAL SYSTEM TO CHARGE CAPACITORS

(71) Applicant: DELPHI AUTOMOTIVE SYSTEMS LUXEMBOURG S.A., Bascharage (LU)

(72) Inventors: Joseph A. Engel, Differdange (LU); Scott Gerber, Kokomo, IN (US); Alexandre M. Reis, Kokomo, IN (US)

(73) Assignee: DELPHI AUTOMOTIVE SYSTEMS LUXEMBOURG S.A., Luxembourg (LU)

( * ) Notice: Subject to any disclaimer, the term of this patent is extended or adjusted under 35 U.S.C. 154(b) by 63 days.

(21) Appl. No.: 16/234,818

(22) Filed: Dec. 28, 2018

(65) Prior Publication Data
US 2020/0212698 A1   Jul. 2, 2020

(51) Int. Cl.
*H02J 7/00* (2006.01)
*B60L 1/12* (2006.01)
*B60R 16/033* (2006.01)
*H05B 1/02* (2006.01)
*H02J 7/34* (2006.01)

(52) U.S. Cl.
CPC ............. *H02J 7/0068* (2013.01); *B60L 1/12* (2013.01); *B60R 16/033* (2013.01); *H05B 1/0236* (2013.01); *H02J 7/345* (2013.01)

(58) Field of Classification Search
CPC ........... H02J 7/0068; H02J 7/345; B60L 1/12; B60R 16/033; H05B 1/0236
See application file for complete search history.

(56) References Cited

U.S. PATENT DOCUMENTS

| RE43,956 E | 2/2013 | King et al. | |
|---|---|---|---|
| RE45,431 E | 3/2015 | King et al. | |
| 9,263,778 B2* | 2/2016 | Han | H01M 10/615 |
| 10,425,049 B2* | 9/2019 | Yeo | H03F 3/2171 |
| 2007/0159007 A1 | 7/2007 | King et al. | |
| 2012/0025756 A1* | 2/2012 | Xu | H01M 10/651 320/103 |
| 2012/0126757 A1 | 5/2012 | Tiritoglu | |
| 2012/0161711 A1* | 6/2012 | Xu | H01M 10/425 320/129 |
| 2014/0329113 A1* | 11/2014 | Han | H01M 10/4264 429/7 |

FOREIGN PATENT DOCUMENTS

| CN | 102097798 A | 6/2011 |
|---|---|---|
| KR | 1020130019085 A | 2/2013 |

* cited by examiner

*Primary Examiner* — Jared Fureman
*Assistant Examiner* — Michael J Warmflash
(74) *Attorney, Agent, or Firm* — Joshua M. Haines

(57) ABSTRACT

An electrically powered vehicle system including a battery, the terminals of which supply positive and negative power rails, and including a bulk capacitor located in series with a switching device, and being electrically connected between the power rails. A heater having a heating resistance is connected in series with a heater switch, and is electrically connected between the power rails. A link is electrically connected between a point between the bulk capacitor and the switching device to a point between heating resistance and the heater switch.

7 Claims, 1 Drawing Sheet

VEHICLE ELECTRICAL SYSTEM TO CHARGE CAPACITORS

TECHNICAL FIELD

This application relates to electrically powered vehicles and has particular application to improved apparatus to control the charging of capacitors of such vehicles including bulk capacitors.

BACKGROUND OF THE INVENTION

Electrically powered vehicles typically include bulk capacitors in their use. These are used to store charge especially e.g. for high load applications. It is necessary to control the charging of such bulk capacitors and for this purpose, bespoke circuitry and expensive components are needed to carefully control the charge. It is an object of the invention to reduce the complexity and cost of such circuitry and components

SUMMARY OF THE INVENTION

In one aspect of the invention is provided an electrically powered vehicle system including a battery, the terminal of which supply positive and negative power rails, and including a bulk capacitor located in series with a switching device, and being electrically connected between said power rails, and including a heater having a heating resistance connected in series with a heater switch, and being electrically connected between said power rails, and including a further link, electrically connected between a point between said bulk capacitor and said switching device to a point between said heating resistance and said heater switch.

Said link may include switching means.

Said switching means in said link may be adapted to be selectively switched to provide a flow path such that current can flow through said link and heater resistance to charge said capacitor.

Said system may include a blocking device or diode adapted to prevent flow through link in one direction.

The term link can be interpreted as an electrical connection (e.g. between two points) and the switching means in the link is a switch located in the link to activate or deactivate the electrical connection.

BRIEF DESCRIPTION OF THE DRAWINGS

The present invention is now described by way of example with reference to the accompanying drawings in which.

DESCRIPTION OF THE PREFERRED EMBODIMENTS

Figure 1:
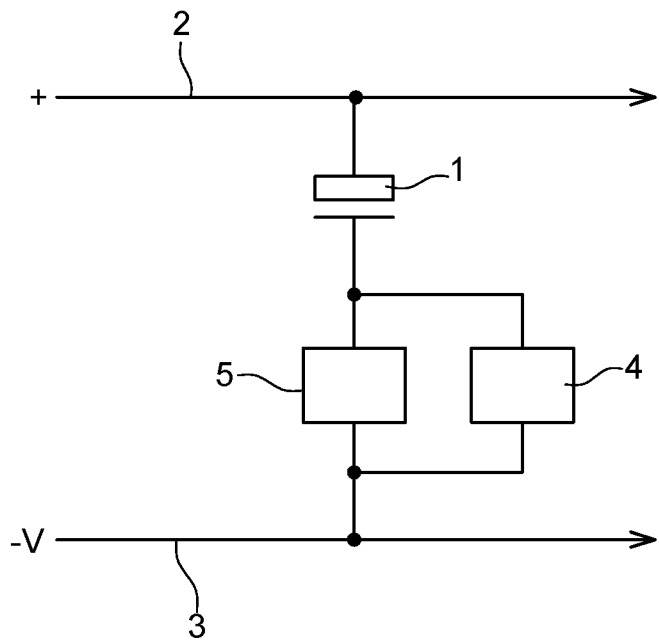
FIG. 1 shows a prior art bulk capacitor charging system.

FIG. 1 shows a schematic circuit diagram showing the connection of bulk capacitor 1 in an electrical vehicle in a prior art system. Shown are two power/voltage lines or rails 2, 3 which are connected to either terminal; the vehicle battery which may be regarded as being positioned on left hand side of the figure. The top rail is the positive and the bottom is the negative. The rails also supply vehicle devices, systems and components further (as indicated by the arrows). The bulk capacitor 1 is shown which has connections between the battery voltage i.e. spans the positive rail 2 and negative rail 3.

In series with the bulk capacitor 1 is a switching device 5 which may comprise e.g. of an IGBT and relay. This allows control of charging and discharge of the bulk capacitor 1. In parallel with switching device 5 is provided a further device 4 whose function is a soft turn-on circuitry/switch which controls the charging/discharging of the bulk capacitor 1. This is a relatively expensive device and may include switches and positive temperature coefficient (PTC) resistors and designed to withstand the charge entering into it and may include special precharge capability.

So, in summary, the present arrangement provides the capability to control the charge in the bulk capacitor 1 taken from the positive rails 2 and negative rail 3 in a way that device 4 limits the current by adding a resistor or PTC resistor (self-regulating device) in series with the bulk capacitor 1. This spreads the voltage ramp over time, resulting is a lower current that the system can afford to supply.

Once the charge across the bulk capacitor 1 is in the correct range, the switching device 5 implemented as a switch or FET or relay links the bulk capacitor 1 directly across the positive rail 2 and the negative rail 3 with low losses. The switching device 5 is bypassed. It does not create any further losses. The cost of the regulation device 4, its space, and the complexity/failure modes are extra cost currently accepted by the market.

In aspects of the invention use is made of the heater resistance in a vehicle heater device to charge/discharge the bulk capacitor. The heater device may be the heater used to heat the bulk capacitor 1 (bank) but may be any heater.

Figure 2:
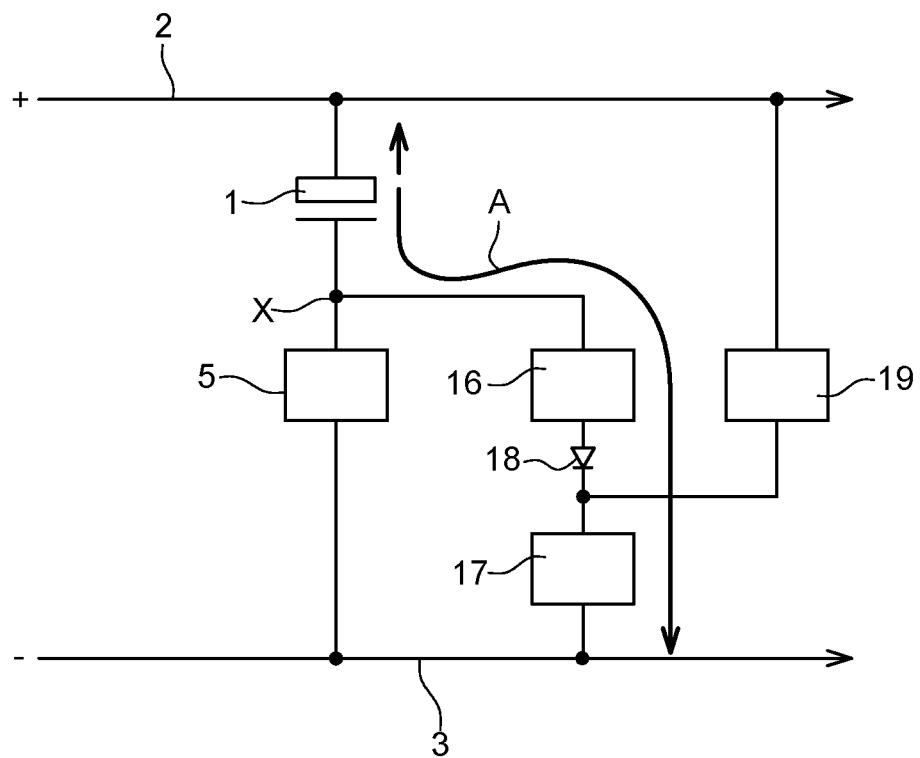
FIG. 2 shows a bulk capacitor charging system according to one aspect.

FIG. 2 shows an arrangement according to one aspect of the invention. Here, use is made of the heater resistance in a vehicle heater device. The vehicle heater device may be for example the heater which is used to warm up the capacitor bank or battery but may be any heater. The advantage of the heater device for the capacitor bank/battery is its physical closeness (proximity). In an aspect of the invention, the heater resistance is used to take the load when charging the capacitor. So effectively, the heater resistance is used for two functions.

The circuitry is similar to before with positive rail 2 and negative rail 3 which are effectively the same as positive rail 2 and negative rail 3 of FIG. 1 and are connected to the respective battery terminals. The rails also supply vehicle systems/devices and components further (as indicated by the arrows again) including e.g. a heater device 17 including a heating resistance. The bulk capacitor 1 is shown which has connections between the battery voltage i.e. spans the positive rail 2 and negative rail 3. In series with the bulk capacitor 1 is a switching device 5 which may comprise e.g. of an IGBT and relay as before—it can be the same as switching device 5 of FIG. 1. Heater device 17 with the heating resistance provides heat to heat the bulk capacitor 1 and is controlled by a heater control stage 19. The heater device 17 and heater control stage 19 are connected to the battery/power supply through positive rail 2 and negative rail 3.

In addition, there is a connection to the heater device 17 from a point X on one terminal of the bulk capacitor 1 (between the bulk capacitor 1 and switching device 5) via a switching device 16 and an optional blocking device 18 (the latter which are in series). The blocking device 18 may effectively comprise a diode.

As mentioned with the prior art, when charging a capacitor additional circuitry is needed in prior art systems (such as device 4 in e.g. FIG. 1) is used to control the charge and needs to take energy at the same time. This requires robust and expensive design such as the device 4 of FIG. 1. However, in the arrangement of FIG. 2 when charging the bulk capacitor 1, heater device 17 accepts energy rather than (i.e. at the expense) of switching device 5 previously used, which can thus be eliminated. The heater device can take (handle) the energy as the heating resistance is actually designed to take a lot of current/power. Thus, switching device 16 and blocking device 18 replace previous device 4 along with the connection to the heater device. Thus, relatively cheap switching device 16 and blocking device 18 are needed instead of device 4.

The skilled person would readily be aware of how the switching of the heater device 17 can be used to accept current during capacitor charging/discharging or its normal function can be effected e.g. by appropriate switching in heater control stage 19 and switching device 16.

In other words, the future arrangement provides the capability to take power from positive rail 2 and negative rail 3 to charge the bulk caps (in the charger) 1. The slow charge path, shown by bold arrow A, is formed by the switching device 16 and the heater device 17 via the blocking device 18. During this time, the heater control stage 19 is not in operation or must provide enough of the correct state to charge the bulk capacitor 1.

Once the pre-charge is achieved, the path of the bulk capacitor 1 to the negative rail 3 is established by switching device 5 and the blocking device 18 prevents back feeding of power when the heater device 17 is activated by the heater control stage 19.

The complexity and failure modes, the cost and the dynamic behavior are improved. The robust heater device 17 is utilized to save the presently used PTC solutions.

We claim:

1. A electrically powered vehicle system comprising:
   a positive power rail connectable to a positive terminal of a battery;
   a negative power rail connectable to a negative terminal of the battery;
   a bulk capacitor located in series with a switching device and connected between said positive power rail and said negative power rail such that said bulk capacitor and said switching device are electrically connected in series between said positive power rail and said negative power rail;
   a heater having a heating resistance connected in series with a heater switch and being electrically connected between said positive power rail and said negative power rail such that said heater and said heater switch are electrically connected in series between said positive power rail and said negative power rail and such that said heater and said heater switch are arranged in parallel with said bulk capacitor and said switching device between said positive power rail and said negative power rail; and
   a link electrically connected between a first point between said bulk capacitor and said switching device to a second point between said heater and said heater switch.

2. A system as claimed in claim 1, wherein said link includes a switching means.

3. A system as claimed in claim 2, wherein said switching means in said link is adapted to be selectively switched to provide a flow path such that current can flow through said link and said heater to charge said bulk capacitor.

4. A system as claimed in claim 1 including a blocking device adapted to prevent flow through said link in one direction.

5. A system as claimed in claim 4, wherein said blocking device is a diode which prevents flow from said second point to said first point.

6. A system as claimed in claim 1, wherein said bulk capacitor is located between said positive power rail and said switching device.

7. A system as claimed in claim 6, wherein said heater switch is located between said positive power rail and said heater.

* * * * *